(12) United States Patent
Hertel et al.

(10) Patent No.: US 12,000,560 B2
(45) Date of Patent: *Jun. 4, 2024

(54) ILLUMINATION SYSTEMS FOR REFLECTIVE DISPLAYS

(71) Applicant: E INK CORPORATION, Billerica, MA (US)

(72) Inventors: Dirk Hertel, Quincy, MA (US); Richard J. Paolini, Jr., Framingham, MA (US); Benjamin Harris Paletsky, Morris, CT (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,808

(22) Filed: Jun. 5, 2023

(65) Prior Publication Data

US 2023/0349533 A1 Nov. 2, 2023

Related U.S. Application Data

(60) Continuation of application No. 17/876,910, filed on Jul. 29, 2022, now Pat. No. 11,708,958, which is a
(Continued)

(51) Int. Cl.
*F21S 43/30* (2018.01)
*F21S 41/64* (2018.01)
(Continued)

(52) U.S. Cl.
CPC ............... *F21S 43/30* (2018.01); *F21S 43/26* (2018.01); *F21V 14/003* (2013.01); *G03B 21/10* (2013.01);
(Continued)

(58) Field of Classification Search
CPC ........ G02B 21/10; G02B 21/14; G02B 21/62; G02F 1/1677; G02F 1/167
(Continued)

(56) References Cited

U.S. PATENT DOCUMENTS

| | | |
|---|---|---|
| 4,418,346 A | 11/1983 | Batchelder |
| 5,515,184 A | 5/1996 | Caulfield et al. |

(Continued)

FOREIGN PATENT DOCUMENTS

| | | |
|---|---|---|
| WO | 1999067678 A2 | 12/1999 |
| WO | 2000005704 A1 | 2/2000 |

(Continued)

OTHER PUBLICATIONS

Wood, D., "An Electrochromic Renaissance?" Information Display, 18(3), 24 (Mar. 2002).
(Continued)

*Primary Examiner* — Jerry L Brooks
(74) *Attorney, Agent, or Firm* — Rajesh Vallabh

(57) ABSTRACT

A display device (30) comprises a reflective display (38) arranged to render a first image viewable through a viewing surface and a projection means (31-37) arranged to render a second image viewable in reflection on the viewing surface, the reflective display (38) and the projection means (31-37) being mounted on a common frame.

15 Claims, 7 Drawing Sheets

Related U.S. Application Data division of application No. 16/218,564, filed on Dec. 13, 2018, now Pat. No. 11,460,165, which is a continuation of application No. 13/867,633, filed on Apr. 22, 2013, now Pat. No. 10,190,743.

(60) Provisional application No. 61/654,405, filed on Jun. 1, 2012, provisional application No. 61/636,070, filed on Apr. 20, 2012.

(51) Int. Cl.
*F21S 43/20* (2018.01)
*F21V 14/00* (2018.01)
*G02F 1/167* (2019.01)
*G02F 1/1677* (2019.01)
*G03B 21/10* (2006.01)
*G03B 21/14* (2006.01)
*G03B 21/608* (2014.01)
*G03B 21/62* (2014.01)

(52) U.S. Cl.
CPC ............ *G03B 21/14* (2013.01); *F21S 41/645* (2018.01); *G02F 1/167* (2013.01); *G02F 1/1677* (2019.01); *G03B 21/608* (2013.01); *G03B 21/62* (2013.01)

(58) Field of Classification Search
USPC ......................................................... 353/28
See application file for complete search history.

(56) References Cited

U.S. PATENT DOCUMENTS

| | | |
|---|---|---|
| 5,671,994 A | 9/1997 | Tai et al. |
| 5,760,761 A | 6/1998 | Sheridon |
| 5,777,782 A | 7/1998 | Sheridon |
| 5,796,509 A | 8/1998 | Doany et al. |
| 5,808,783 A | 9/1998 | Crowley |
| 5,872,552 A | 2/1999 | Gordon, II et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,118,426 A | 9/2000 | Albert et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,134,092 A | 10/2000 | Pelka et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,252,564 B1 | 6/2001 | Albert et al. |
| 6,271,823 B1 | 8/2001 | Gordon, II et al. |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,616,284 B2 | 9/2003 | Yaniv et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,704,133 B2 | 3/2004 | Gates et al. |
| 6,710,540 B1 | 3/2004 | Albert et al. |
| 6,724,519 B1 | 4/2004 | Comiskey et al. |
| 6,738,050 B2 | 5/2004 | Comiskey et al. |
| 6,750,473 B2 | 6/2004 | Amundson et al. |
| 6,750,996 B2 | 6/2004 | Jagt et al. |
| 6,788,449 B2 | 9/2004 | Liang et al. |
| 6,816,147 B2 | 11/2004 | Albert |
| 6,819,471 B2 | 11/2004 | Amundson et al. |
| 6,825,068 B2 | 11/2004 | Denis et al. |
| 6,825,829 B1 | 11/2004 | Albert et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,853,486 B2 | 2/2005 | Cruz-Uribe et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,030,412 B1 | 4/2006 | Drzaic et al. |
| 7,030,854 B2 | 4/2006 | Baucom et al. |
| 7,038,655 B2 | 5/2006 | Herb et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,119,759 B2 | 10/2006 | Zehner et al. |
| 7,148,128 B2 | 12/2006 | Jacobson |
| 7,163,332 B2 | 1/2007 | Shimizu et al. |
| 7,167,155 B1 | 1/2007 | Albert et al. |
| 7,170,506 B2 | 1/2007 | Eldon et al. |
| 7,170,670 B2 | 1/2007 | Webber |
| 7,173,752 B2 | 2/2007 | Doshi et al. |
| 7,176,880 B2 | 2/2007 | Amundson et al. |
| 7,178,964 B2 | 2/2007 | Sugiura et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,291 B2 | 6/2007 | Kaga et al. |
| 7,239,360 B2 | 7/2007 | Bassi et al. |
| 7,256,766 B2 | 8/2007 | Albert et al. |
| 7,259,744 B2 | 8/2007 | Arango et al. |
| 7,280,094 B2 | 10/2007 | Albert |
| 7,304,787 B2 | 12/2007 | Whitesides et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,387,858 B2 | 6/2008 | Chari et al. |
| 7,388,572 B2 | 6/2008 | Duthaler et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |

(56) References Cited

U.S. PATENT DOCUMENTS

| | | |
|---|---|---|
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler et al. |
| 7,649,674 B2 | 1/2010 | Danner et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,705,824 B2 | 4/2010 | Baucom et al. |
| 7,747,098 B2 | 6/2010 | Ward |
| 7,750,886 B2 | 7/2010 | Sampsell |
| 7,785,988 B2 | 8/2010 | Amundson et al. |
| 7,791,789 B2 | 9/2010 | Albert et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry et al. |
| 7,910,175 B2 | 3/2011 | Webber |
| 7,920,320 B2 | 4/2011 | Watson et al. |
| 7,933,462 B2 | 4/2011 | Ward |
| 7,936,499 B2 | 5/2011 | Kim et al. |
| 7,949,213 B2 | 5/2011 | Mienko et al. |
| 7,952,790 B2 | 5/2011 | Honeyman et al. |
| 7,956,841 B2 | 6/2011 | Albert et al. |
| 7,957,053 B2 | 6/2011 | Honeyman et al. |
| 7,986,450 B2 | 7/2011 | Cao et al. |
| 8,009,344 B2 | 8/2011 | Danner et al. |
| 8,009,348 B2 | 8/2011 | Zehner et al. |
| 8,027,081 B2 | 9/2011 | Danner et al. |
| 8,040,594 B2 | 10/2011 | Paolini, Jr. et al. |
| 8,049,947 B2 | 11/2011 | Danner et al. |
| 8,054,526 B2 | 11/2011 | Bouchard |
| 8,061,882 B2 | 11/2011 | Bita et al. |
| 8,064,962 B2 | 11/2011 | Wilcox et al. |
| 8,077,141 B2 | 12/2011 | Duthaler et al. |
| 8,089,453 B2 | 1/2012 | Comiskey et al. |
| 8,098,418 B2 | 1/2012 | Paolini, Jr. et al. |
| 8,130,441 B2 | 3/2012 | Frazier et al. |
| 8,208,193 B2 | 6/2012 | Patry et al. |
| 8,213,076 B2 | 7/2012 | Albert et al. |
| 8,231,233 B2 | 7/2012 | Schuler et al. |
| 8,238,020 B2 | 8/2012 | Yamamoto et al. |
| 8,313,199 B2 | 11/2012 | Hirata et al. |
| 8,319,759 B2 | 11/2012 | Jacobson et al. |
| 8,337,020 B2 | 12/2012 | Handschy et al. |
| 8,363,299 B2 | 1/2013 | Paolini, Jr. et al. |
| 8,363,305 B2 | 1/2013 | Yang et al. |
| 8,373,211 B2 | 2/2013 | Amundson et al. |
| 8,382,295 B1 * | 2/2013 | Kim .................. G03B 29/00 715/764 |
| 8,389,381 B2 | 3/2013 | Amundson et al. |
| 8,441,714 B2 | 5/2013 | Paolini, Jr. et al. |
| 8,441,716 B2 | 5/2013 | Paolini, Jr. et al. |
| 8,466,614 B2 | 6/2013 | Hsiao et al. |
| 8,466,852 B2 | 6/2013 | Drzaic et al. |
| 8,498,042 B2 | 7/2013 | Danner et al. |
| 8,553,012 B2 | 10/2013 | Baucom et al. |
| 8,576,470 B2 | 11/2013 | Paolini, Jr. et al. |
| 8,576,476 B2 | 11/2013 | Telfer et al. |
| 8,593,721 B2 | 11/2013 | Albert et al. |
| 8,610,988 B2 | 12/2013 | Zehner et al. |
| 8,654,061 B2 | 2/2014 | Mienko et al. |
| 8,699,120 B2 | 4/2014 | Kim et al. |
| 8,728,266 B2 | 5/2014 | Danner et al. |
| 8,754,859 B2 | 6/2014 | Gates et al. |
| 8,797,634 B2 | 8/2014 | Paolini, Jr. et al. |
| 8,822,782 B1 | 9/2014 | Cunnyngham et al. |
| 8,830,559 B2 | 9/2014 | Honeyman et al. |
| 8,830,560 B2 | 9/2014 | Danner et al. |
| 8,836,668 B2 | 9/2014 | Cok |
| 8,873,129 B2 | 10/2014 | Paolini, Jr. et al. |
| 8,891,155 B2 | 11/2014 | Danner et al. |
| 8,902,153 B2 | 12/2014 | Bouchard et al. |
| 8,952,263 B2 | 2/2015 | Cok |
| 9,152,003 B2 | 10/2015 | Danner et al. |
| 9,152,004 B2 | 10/2015 | Paolini, Jr. et al. |
| 9,170,467 B2 | 10/2015 | Whitesides et al. |
| 9,179,182 B2 | 11/2015 | Huebner |
| 9,199,441 B2 | 12/2015 | Danner |
| 9,293,511 B2 | 3/2016 | Jacobson et al. |
| 9,310,661 B2 | 4/2016 | Wu et al. |
| 9,530,381 B1 | 12/2016 | Bozarth et al. |
| 9,620,066 B2 | 4/2017 | Bishop |
| 9,829,764 B2 | 11/2017 | Paolini, Jr. et al. |
| 10,190,743 B2 | 1/2019 | Hertel et al. |
| 10,372,008 B2 | 8/2019 | Telfer et al. |
| 11,708,958 B2 * | 7/2023 | Hertel .................. F21S 43/26 353/121 |
| 2002/0060321 A1 | 5/2002 | Kazlas et al. |
| 2002/0090980 A1 | 7/2002 | Wilcox et al. |
| 2003/0020975 A1 | 1/2003 | Mets et al. |
| 2004/0105036 A1 | 6/2004 | Danner et al. |
| 2004/0119681 A1 | 6/2004 | Albert et al. |
| 2005/0122306 A1 | 6/2005 | Wilcox et al. |
| 2005/0122563 A1 | 6/2005 | Honeyman et al. |
| 2005/0206846 A1 | 9/2005 | Yeung et al. |
| 2006/0187185 A1 * | 8/2006 | Yoshinaga ............ G09G 3/344 345/107 |
| 2007/0052757 A1 | 3/2007 | Jacobson |
| 2007/0146646 A1 | 6/2007 | Rodriguez, Jr. |
| 2007/0285385 A1 | 12/2007 | Albert et al. |
| 2008/0024430 A1 | 1/2008 | Roh |
| 2008/0043318 A1 | 2/2008 | Whitesides et al. |
| 2008/0048970 A1 | 2/2008 | Drzaic et al. |
| 2009/0122389 A1 | 5/2009 | Whitesides et al. |
| 2009/0225398 A1 | 9/2009 | Duthaler et al. |
| 2009/0315044 A1 | 12/2009 | Amundson et al. |
| 2010/0134765 A1 * | 6/2010 | Deppe .................. H05B 41/36 353/121 |
| 2010/0156780 A1 | 6/2010 | Jacobson et al. |
| 2010/0238529 A1 | 9/2010 | Sampsell et al. |
| 2011/0140744 A1 | 6/2011 | Kazlas et al. |
| 2011/0187683 A1 | 8/2011 | Wilcox et al. |
| 2011/0292319 A1 | 12/2011 | Cole |
| 2012/0326957 A1 | 12/2012 | Drzaic et al. |
| 2013/0155090 A1 | 6/2013 | Pourbigharaz et al. |

FOREIGN PATENT DOCUMENTS

| | | | |
|---|---|---|---|
| WO | 2000036560 A1 | 6/2000 | |
| WO | 2000038000 A1 | 6/2000 | |
| WO | 2005114316 A1 | 12/2005 | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office; PCT/US2013/037587; International Search Report and Written Opinion; Aug. 21, 2013.

Yu, Nanfang et al., "Light Propogation with Phase Discontinuities: Generalized Laws of Reflection and Refraction", Science Express DOI: 10.1126/science. 1210713, Sep. 1, 2011.

(56) References Cited

OTHER PUBLICATIONS

Paddock, Ashley N., "Designer surfaces rewrite laws of refraction and reflection", Photonics Spectra, 45(11), pp. 18-19, Nov. 2011.
Perry, Caroline, "From a flat mirror, designer light," Harvard School of Engineering and Applied Sciences, Sep. 1, 2011.
Brennesholtz, Matthew, "2011 Pico/Micro Projector Human Factor Analysis", Insight Media Report, (Jan. 2001).

* cited by examiner

ILLUMINATION SYSTEMS FOR REFLECTIVE DISPLAYS

REFERENCE TO RELATED APPLICATIONS

This application is a continuation of U.S. patent application Ser. No. 17/876,910, filed Jul. 29, 2022, which is a divisional of U.S. patent application Ser. No. 16/218,564, filed Dec. 13, 2018, which is a continuation of co-pending application Ser. No. 13/867,633 filed on Apr. 22, 2013, now U.S. Pat. No. 10,190,743, which claimed the benefit of provisional Application Ser. Nos. 61/636,070, filed Apr. 20, 2012, and 61/654,405, filed Jun. 1, 2012. However, the applicant hereby declares, in accordance with 37 CFR 1.78(a)(6), that the text of this application also contains an invention that has an effective filing date on or after Mar. 16, 2013.

The entire contents of the aforementioned copending applications, and of all patents, copending applications, and published applications mentioned below are herein incorporated by reference.

BACKGROUND OF INVENTION

This invention relates to illumination systems for reflective displays. More specifically, this invention relates to a display and means for projecting patterned light onto at least a part of the display. This invention also relates to a method for directing spatially and spectrally modulated illumination on to a reflective display to improve contrast and colorfulness under ambient lighting conditions. Certain embodiments of the present invention relate to a display, intended primarily for outdoor use but which may also find some application indoors (in the sense of use within buildings, tents and other similar structures); these embodiments of the display of the present invention make use of a reflective bistable electro-optic display in conjunction with a light source arranged to illuminate the reflective electro-optic display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376, 828; 6,392,786; 6,413,790; 6,422,687; 6,445,374; 6,480,182; 6,498,114; 6,506,438; 6,518,949; 6,521, 489; 6,535,197; 6,545,291; 6,639,578; 6,657,772; 6,664,944; 6,680,725; 6,683,333; 6,724,519; 6,750, 473; 6,816,147; 6,819,471; 6,825,068; 6,831,769; 6,842,167; 6,842,279; 6,842,657; 6,865,010; 6,967, 640; 6,980,196; 7,012,735; 7,030,412; 7,075,703; 7,106,296; 7,110,163; 7,116,318; 7,148,128; 7,167, 155; 7,173,752; 7,176,880; 7,190,008; 7,206,119; 7,223,672; 7,230,751; 7,256,766; 7,259,744; 7,280, 094; 7,327,511; 7,349,148; 7,352,353; 7,365,394; 7,365,733; 7,382,363; 7,388,572; 7,442,587; 7,492, 497; 7,535,624; 7,551,346; 7,554,712; 7,583,427; 7,598,173; 7,605,799; 7,636,191; 7,649,674; 7,667, 886; 7,672,040; 7,688,497; 7,733, 335; 7,785,988; 7,843,626; 7,859,637; 7,893,435; 7,898,717; 7,957, 053; 7,986,450; 8,009,344; 8,027,081; 8,049,947; 8,077,141; 8,089,453; 8,208,193; and 8,373,211; and U.S. Patent Applications Publication Nos. 2002/ 0060321; 2004/0105036; 2005/0122306; 2005/ 0122563; 2007/0052757; 2007/0097489; 2007/ 0109219; 2007/0211002; 2009/0122389; 2009/ 0315044; 2010/0265239; 2011/0026101; 2011/ 0140744; 2011/0187683; 2011/0187689; 2011/ 0286082; 2011/0286086; 2011/0292319; 2011/ 0292493; 2011/0292494; 2011/0297309; 2011/ 0310459; and 2012/0182599; and International Application Publication No. WO 00/38000; European Patents Nos. 1,099,207 B1 and 1,145,072 B1;

(e) Color formation and color adjustment; see for example U.S. Pat. Nos. 6,017,584; 6,664,944; 6,864,875; 7,075, 502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/ 0004442; 2009/0225398; 2010/0103502; 2010/ 0156780; 2011/0164307; 2011/0195629; 2011/ 0310461; 2012/0008188; 2012/0019898; 2012/ 0075687; 2012/0081779; 2012/0134009; 2012/ 0182597; 2012/0212462; 2012/0157269; and 2012/ 0326957;

(f) Methods for driving displays; see for example U.S. Pat. Nos. 7,012,600 and 7,453,445;

(g) Applications of displays; see for example U.S. Pat. Nos. 6,118,426; 6,473,072; 6,704,133; 6,710,540; 6,738,050; 6,825,829; 7,030,854; 7,119,759; 7,312, 784; and 8,009,348; 7,705,824; and 8,064,962; and U.S. Patent Applications Publication Nos. 2002/ 0090980; 2004/0119681; 2007/0285385; and 2010/ 0201651; and International Application Publication No. WO 00/36560; and (h) Non-electrophoretic displays, as described in U.S. Pat. Nos. 6,241,921; 6,950,220; 7,420,549 and 8,319,759; and U.S. Patent Application Publication No. 2012/ 0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

Regardless of the exact technology used to display data thereon, electro-optic displays may be grouped functionally into two broad categories, namely emissive displays, in which the light is emitted from or transmitted through the active layer, and reflective displays, in which light is reflected from the active layer. An emissive display conveys information by changes in its luminance and may be viewed in the absence of ambient light, whereas a reflective display conveys information by changes in its reflectance and cannot be viewed without ambient light. Emissive displays may incorporate materials that are intrinsically electroluminescent (for example, organic light-emitting diodes, OLEDs) or may be constructed by combining a transmissive or reflective light modulator with a light source; for example, liquid crystal displays (LCDs) commonly combine a non-emissive light valve layer with a backlight. Digital projectors may be regarded as emissive displays comprising a high-intensity light source and a light modulator plus appropriate lenses to deliver an image to a distant, reflective surface. All emissive displays have the disadvantage that their contrast and colorfulness both depend upon the intensity of ambient light. In very bright environments, such as sunlight, the emitted light may be overwhelmed and the displayed information difficult to see. Reflective displays have the advantage that their contrast and colorfulness are not affected by the level of ambient light, indeed their contrast and colorfulness even improve in very bright light. However, reflective displays are obviously difficult to see in dim light.

A further difficulty arises with reflective displays intended to render colored images. As described, for example, in U.S. Pat. No. 8,054,526, a color filter array may be positioned so that an appropriate black-and-white image is viewed through the color filter array. Although a color image is thus provided to the viewer, the color filters necessarily reduce the amount of light reflected from the display in the white state, and the necessary sharing of the available display surface area between the different color primaries limits colorfulness and color gamut.

Numerous attempts have been made to construct hybrid emissive/reflective displays visible in any ambient light. For example, U.S. Pat. No. 7,170,506 describes a hybrid emissive/reflective display in which the intensity of the emitted light is adjustable. As previously noted, the legibility of information on an emissive display suffers under very bright ambient light, so that the intrinsic luminance of the display must be increased to counter the resultant loss of contrast and colorfulness. Conversely, the legibility of information on a reflective display suffers under very low lighting conditions so that the illumination of the display must be increased accordingly to counter the loss of contrast and colorfulness.

Technical solutions have been developed to increase the contrast ratio of emissive displays, so such displays can display high dynamic range (HDR) still and moving images. Some of these so-called HDR displays combine an LCD color panel with a bright backlight, and modulate this backlight with image information, usually in the form of a low-pass filtered luminance channel (this approach is sometimes termed "local dimming"). In more general terms, HDR display can be accomplished by combining two low dynamic range (or low contrast ratio) devices, and by generating from the HDR image two low dynamic range images for each of the display devices. Examples of modulated backlights include the digital projectors or LED arrays described in U.S. Patent Applications Publication Nos. 2008/0137990 and 2008/0137976. However, no equivalent solution is currently known to increase the contrast and colorfulness of reflective displays.

It is known that spatially congruent combinations of projected and reflective images can have contrast ratios exceeding that of either the separate projected and reflective images. A solution that aims at increasing the contrast of projected images is described in U.S. Pat. No. 6,853,486 (the '486 patent). This patent describes an active projection screen that is in registration with the projected image and is used to increase the contrast of the projected image under bright ambient light that would otherwise diminish the contrast of the same image projected on to a uniformly reflective screen. The main drawback to this system is the need to maintain exact registration between the active projection screen and the projector. Without rigid mechanical coupling of projector and screen the required exact alignment and registration are very difficult to achieve and maintain, and the solution described in the '486 patent, namely electronic coupling between projector and screen via 'reflectance processor' and 'display controller', is expensive.

The system described in the '486 patent is a large-size emissive (projection) display, and the patent does not disclose any device in which color projection means image and means for rendering a reflective image are incorporated into the same device, such that both images can be rendered in registration with each other. In one aspect, the present invention seeks to increase the contrast and colorfulness of reflective displays, especially hand-held devices, under a wide range of ambient lighting conditions, by combining projected and reflective images.

One specific application where bistable electro-optic displays may be useful is outdoor signs, especially traffic control devices. Historically, traffic light and other traffic control signals have been relied upon incandescent bulbs to generate light; more recently, light emitting diodes (LED's)

have begun to be used for this purpose. Both incandescent bulbs and LED's (and indeed, all other emissive light sources) require a continuous source of power, typically mains alternating current power, so that any disruption of the power supply due to equipment failure, weather conditions or traffic accidents will result in failure of the traffic lights, traffic hazards and major disruption of traffic flow. Conventional traffic signals have other disadvantages, including:

(a) false signals can occur as a result of sun light and solar glare; conventional traffic lights must overcome ambient light conditions, including specular reflections from various surfaces of the sign, which can make it difficult to discriminate between off and on states of a particular sign, to be noticeable and effective; even the common use of light baffles and high powered LED or incandescent lamps in the range of 25-100 W do not entirely overcome such problems;

(b) traffic lights are located outdoors and hence are subject to harsh mechanical and environmental conditions; they must withstand mechanical damage and remain operational despite vandalism, mechanical shock and impact, extreme temperatures, and exposure to ultraviolet radiation;

(c) total cost of ownership, particularly operating costs, is very important factor in traffic light usage; in New York city alone there are 11,871 traffic lights, and substantial effort is devoted to reducing power usage, including converting incandescent signals to LED's;

(d) strict weight restrictions exist for streetlights to prevent overloading of signage support structures, so industrial design and weight allocations must be carefully managed for signage; and (e) the need (in some cases) for increasing traffic signal size may compromise performance in terms of power consumption, weight, and cost.

Accordingly, the present invention seeks to provide a form of information display (which may have the form of a traffic light or other traffic control device) which overcomes the aforementioned problems of prior art devices.

Similar problems are encountered when the "traffic control device" is an indicator on an automobile or other vehicle. Even relatively high powered bulbs do not guarantee sufficient visibility. For example at highway speeds the driver of one automobile may have to react to a change in the brightness of the brake light of a preceding in a fraction of a second if a crash is to be avoided. Most brake lights on cars have a parabolic reflective enclosure to concentrate the light coming from the bulb. Although such a parabolic reflector does help to concentrate the light from the brake light into a narrow beam, it also concentrates any light incident on the reflective enclosure (for example, from sunlight or light from the headlights of a following vehicle) back through the colored plastic cover, thus creating background reflection that tends to obscure the state of the brake light. In the worst case, when the sun faces the back of the car, the specular reflection of the parabolic reflective enclosure, the reflection of the glossy paint on the car and the reflection from the rear windscreen combine to significantly lower the visibility of the brake light.

In another aspect this invention provides a hybrid emissive-reflective display which can improve the visibility of vehicle-mounted signs in high ambient light conditions, thus providing an added margin of safety and offering the possibility of lowering power consumption.

SUMMARY OF INVENTION

Accordingly, in one aspect this invention provides a display device comprising a reflective display arranged to render a first image viewable through a viewing surface and a projection means arranged to render a second image viewable in reflection on the viewing surface, the reflective display and the projection means being mounted on a common frame. This display device may hereinafter be called the "projection display" of the present invention.

This invention also provides a display device comprising a digital projector and a reflective surface mounted on a common frame, the digital projector comprising a light source, a projection lens and at least one additional optical element adapted to cause a projected image to be formed on the reflective surface, wherein the light passing from the light source through the projection lens is folded by more than 180 degrees in a plane containing the principal axis of the projection lens and a plane of symmetry of the at least one additional optical element before being reflected from the reflective surface.

This invention also provides a reflective display arranged to render a first image viewable through a viewing surface and a projection means comprising a light modulator arranged to render a second image viewable in reflection on the viewing surface, the first and second images being superimposed and having approximately the same width and height, the first image having w1 pixels in the width dimension and h1 pixels in the height dimension, where $h1 > w1$ the second image having w2 pixels in the width dimension and h2 pixels in the height dimension, where $h2 < w2.$ This invention also provides a display device comprising a reflective display arranged to render a first image viewable through a viewing surface and a projection means arranged to render a second image viewable in reflection on the viewing surface, wherein the frame rate of the reflective display differs from that of the projection means by at least 10 percent.

The foregoing displays devices may hereinafter collectively be referred to as the "projection display" of the present invention.

This invention also provides a method for rendering an image using a reflective display arranged to render a first image viewable through a viewing surface and a projection means arranged to render a second image viewable in reflection on the viewing surface, the method comprising:
  (a) separating the image information into at least two components, a first component comprising at least luminance information and a second component comprising chrominance information; and
  (b) using the first component to direct the first image and the second component to direct the second image.

In another aspect, this invention provides an information display comprising a bistable reflective display having a display surface and at least one light emitter arranged to direct light on to the display surface of the reflective display. In one form of the invention, there are at least two separate reflective displays having display surfaces arranged to display differing colors, and independently controllable light emitters arranged to direct light on to the two display surfaces. This form of the invention may have the form of a traffic light, with three separate reflective displays with display surfaces arranged to display red, amber and green respectively and three light emitters arranged to direct light on to the three display surfaces. Alternatively, this form of the invention might, for example, have the form of a crosswalk sign with two separate display surfaces, one forming a red "DON'T WALK" sign and the other a white "WALK" sign, and two light emitters arranged to direct light on to the two display surfaces.

It will be appreciated that, in any information display of the present invention in which the display surface is to display color rather than simply black or white, the necessary chrominance may be supplied either by the surface itself or by the light emitters. Thus, in a display designed to simulate a conventional traffic light, one could use three different colored electro-optic display areas (using either inherently colored media or monochrome media behind color filters) illuminated when necessary by white light emitters, or three monochrome electro-optic media areas illuminated by three different colored light emitters. However, in general the latter is preferred since it provides a higher contrast ratio. The "lit" or colored state of such a monochrome electro-optic medium/colored light emitter display requires that the electro-optic medium be set to its reflective (white) state and the light emitters be turned on so that colored light from the emitters is reflected from the electro-optic medium. In the "unlit" or dark state of such a display, the electro-optic medium is set to its dark, non-reflective state and the light emitters are turned off, thus producing a very dark display surface and a high contrast ratio between the two states of the display. Although this type of display does require constant use of the light emitters, its power demands can be made relatively modest; for example, the number of LED's required as light emitters can be reduced as compared with a conventional LED traffic light, since each LED can illuminate a substantial area of the display surface, in contrast to the conventional LED traffic light in which the entire display surface must be covered with LED's. The LED's in such a display of the invention will typically be arranged in a "light ring" around the periphery of a circular display surface, and providing LED's in such a light ring is likely to be technically simpler than providing a larger number of LED's in a compact array on the display surface of a conventional LED traffic light. Furthermore, because the light from the LED's spreads relatively uniformly over the reflective display surface, the appearance of the traffic light tends to be more attractive than that of a conventional LED traffic light, which suffers from pixelation due to the visibly separate LED's on its display surface.

In another aspect this invention provides an electrophoretic display comprising:
  at least one front electrode through which an observer can view the display;
  a layer of an electrophoretic medium, the electrophoretic medium comprising a fluid and two types of electrically charged particles disposed in the fluid and capable of moving through the fluid on application of an electric field to the fluid, one of the two types of particles being dark in color and the other being reflective and of a color different from that of the dark particles;
  at least one rear electrode disposed on the opposed side of the layer of electrophoretic medium from the front electrode(s), the rear electrode(s) having a plurality of apertures extending therethrough; and
  a light source disposed on the opposed side of the rear electrodes from the layer of electrophoretic medium and arranged to direct light through the layer of electrophoretic medium,
  the display having a first optical state in which the dark particles lie adjacent the front electrode(s), so that the observer sees a dark color, a second optical state in which the reflective particles lie adjacent the front electrode(s), so that the observer sees the color of the reflective particles, and a third optical state is which the dark particles lie adjacent the rear electrode(s), the reflective particles the light source generates light, and the color of the reflective particles is visible to an observer.

This invention extends to a vehicle carrying an electrophoretic display of the invention.

It will be appreciated that in the electrophoretic display of the present invention, the so-called "reflective particles" should not be completely reflective since in the third optical state completely reflective particles will not allow any light to pass through the electrophoretic medium. The reflective particles must be sufficiently reflective to reflect a high proportion of the light incident upon the front electrode(s) when the display is in its second optical state but still sufficiently transmissive to allow light to pass through the reflective particles when the display is in its third optical state. As may be seen from the detailed Examples below, there is no difficulty in finding commercial pigments which meet these requirements.

The displays of the present invention may make use of any of types of bistable electro-optic media previously described. Thus, the electro-optic medium may comprise a rotating bichromal member, electrochromic or electro-wetting material. Alternatively, the electro-optic medium may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

DETAILED DESCRIPTION

Figure 1A:
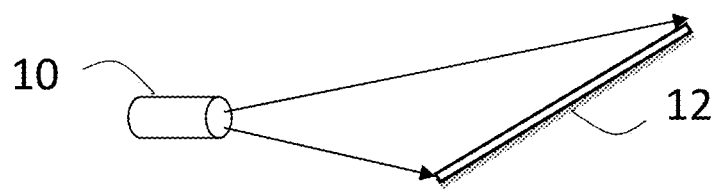
FIGS. 1A-1C of the accompanying drawings are schematic diagrams illustrating artifacts associated with grazing angle projection in a projection display of the present invention.

As indicated above, in one aspect the present invention provides a projection display in which means for projecting a color image and means for rendering a reflective image are incorporated into a single unit such that both images can be superimposed in registration with one another, so that a composite image of improved color quality, visible in a wider range of ambient illumination conditions, can be obtained, compared with that which could be rendered by either the reflective display or the projector alone. In low light, the projected image is easily visible, its contrast being enhanced by the reflective image on to which it is superimposed. In bright light the projected image will fade but the reflective image will be well lit and seen to good advantage. In order to conserve power, it is desirable that the intensity of the projected image be adjusted depending on the ambient illumination (whose intensity can be measured by means well known in the art, such as photodiodes, etc.). In very bright light the projector may be turned off completely.

The reflective display used in the projection display of the present invention can be any of the types previously described, including but not limited to electrophoretic, electro-wetting, electrochromic, rotating bichromal, and reflective liquid crystal; electrophoretic displays may for example be of the magnetophoretic and/or frustrated total internal reflection subtypes. Other types of reflective displays known in the art, for example electronic liquid powder, micromechanical (interferometric), photonic crystal (structural color), electrohydrodynamic, and light valve/reflector, may also be employed.

In one preferred form of the invention, the reflective display comprises an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

Projection means ("engines") for use in the projections displays of the present invention may use various technologies including light sources such as color light-emitting diodes (LED) and solid state color laser sources, in conjunction with light modulators such as microdisplays made using techniques including liquid crystal on silicon (LCoS), deformable mirror displays (DMD) or scanning mirrors (a type of micro-electromechanical system, MEMS). Combinations of light source, light modulator and associated optics, such as beam splitters and projection lenses, are well known in the art, and can be packaged into such small dimensions that they are currently referred to as pico-projectors. In preferred forms of the present invention a pico-projector is embedded into a mobile reflective display device such as an electronic document reader (E-reader) or electronic book (E-book) to form a hybrid display.

The technical challenges in combining a pico-projector with a mobile reflective display are very difficult. As a mobile device, the hybrid display has to be compact. The embedded pico-projection system must not substantially increase the size and weight of the E-reader. The projector must not obstruct the view of the screen and the range of viewing angles of a user reading the display. To provide compactness and unobstructed viewing, angled projection is required. Such projection is used in "short-throw" and "ultra-short-throw" projectors and is well-known in the art; see for example U.S. Pat. No. 7,239,360. Some artifacts associated with short-throw projection are described in more detail below.

FIG. 1A shows a projector 10 arranged to render an image onto a reflective screen 12 using angled projection, a term used to mean that the central chief ray has an angle of incidence greater than zero (and preferably, in the present invention, at least about 60°) to the normal to the display surface. A large projection angle is desirable because it allows a more compact package, and it increases the range of angles over which the display can be viewed without projector components obstructing the field of vision. As described in more detail below, folding optics may be used such that the projector may be located below the plane of the reflective screen, resulting in maximum compactness. These folding optics are omitted for clarity from FIG. 1A.

Figure 1B:
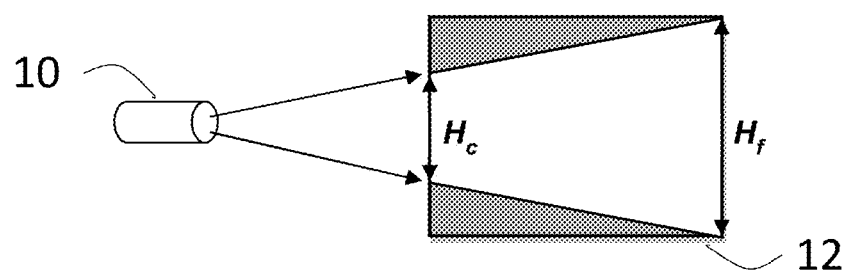
Figure 1C:
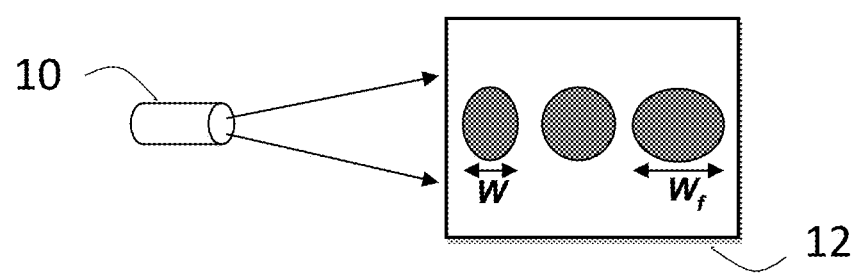

As shown in FIGS. 1B and 1C, angled projection introduces image defects that sharply increase with projection angle: such defects include keystone distortion (see FIG. 1B) and anamorphic distortion (see FIG. 1C). Not illustrated in FIGS. 1A-1C, but still significant, are visible blur (when the dimension of the angled screen exceeds the focus depth of the projector), fall-off of light intensity with projection distance (so that the luminance of the projected image is non-uniform), and other well-known optical aberrations such as chromatic aberration and astigmatism.

In the projection display of the present invention, some of these artifacts may be corrected digitally. For example, keystone and anamorphic distortion, and fall-off of light intensity, may be corrected by projecting an image which has been pre-distorted, spatially and/or in brightness, as is known in the art. Such digital correction comes at the expense of some other attribute of the projected image. For example, spatial correction for keystone and/or anamorphic distortion will reduce the overall resolution of the projected image and light intensity correction will reduce image brightness. As discussed in more detail below, some artifacts (such as blur) are not amenable to digital correction and must be corrected by a suitable choice of optical elements.

The screens of most reflective displays, such as an electronic book readers, (E-readers) are rectangular. For reading a book, the screen is normally used in portrait orientation (that is, with the longer dimension oriented towards and away from the user and the shorter dimension horizontally). Most commercially-available pico-projection engines are also designed to project a rectangular image. However when such engines are projecting at an angle, the most compact package dimensions (i.e., the smallest "throw ratio", which is the distance between the projector and the screen divided by the diagonal dimension of the screen) are achieved when the projector's landscape orientation is projected onto the portrait orientation of the reflective display, as shown in FIGS. 2A-2C.

Figure 2A:
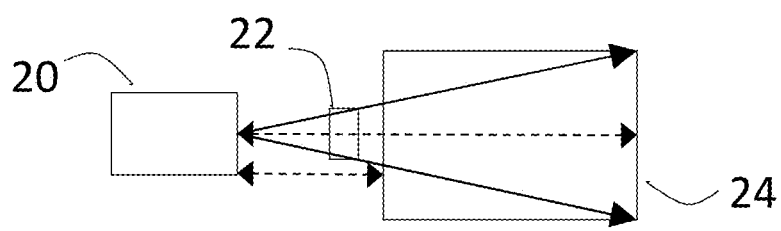
FIGS. 2A-2C are schematic diagrams showing an arrangement of projected and reflective images in a projection display of the present invention.

FIG. 2A shows a light source 20 modulated by a light modulator 22 to form an image that is projected onto a screen 24. The modulator is in landscape orientation, but its image is projected onto the screen which is in portrait orientation.

Figure 2B:
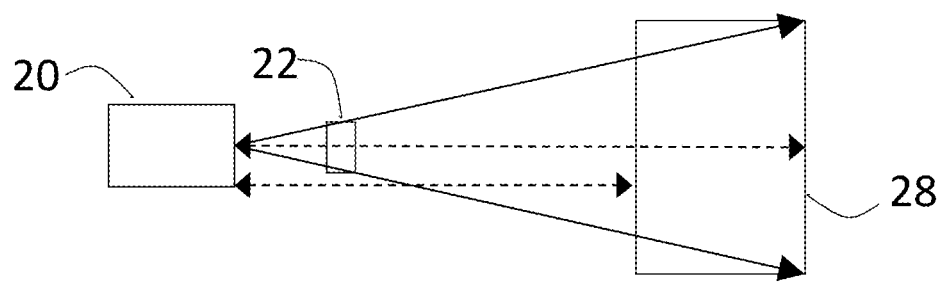

FIG. 2B shows a light source 20 modulated by a light modulator 22 to form an image that is projected onto a screen 28. The modulator and the screen are both in landscape orientation.

Figure 2C:
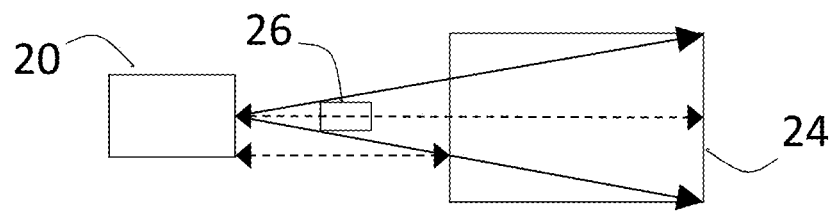

FIG. 2C shows a light source 20 modulated by a light modulator 26 to form an image that is projected onto a screen 24. The modulator is in portrait orientation and its image is projected onto the screen which is in landscape orientation.

It will be clear from FIGS. 2A-2C that the throw ratio is smallest, and therefore the compactness of the device incorporating the screen and the projector the greatest, when the long axis of the modulator is projected onto the short axis of the screen, as shown in FIG. 2A. It is thus preferred, in the projection display of the present invention, that the projected and reflective images are in overall registration and have approximately the same width and height, the reflective display having w1 pixels in the width dimension and h1 pixels in the height dimension, where $h1 > w1$ the light modulator of the projector having w2 pixels in the width dimension and h2 pixels in the height dimension, where $h2 < w2$.

A disadvantage of the arrangement of FIG. 2A is that square pixels in the light modulator 22 become anisotropic in the image projected onto the screen 24, leading to a mismatch between the sizes of the projected image pixels and the (square) pixels on the reflective display screen 24. For example, if the reflective screen is 600×800 pixels (SVGA), and each pixel is square with a width of about 150 μm, while the light modulator of the projection engine is 848×480 pixels (WVGA), the resolution of the projected image cannot be more than about one half that of the image on the reflective display (i.e., the projected pixels, after correction for distortions as mentioned above, are on the order of 300 μm in size, and are not square).

In a projection display of the present invention, the requirement that pixels of the projected image be mapped 1:1 onto the pixels of the reflective display may be relaxed if the achromatic (luminance) information of the combined image is carried by only one of the hybrid display components, either the projected image or the reflective image, or if the spatial frequency content of one of the achromatic image components is reduced so that the effect of misalignment is no longer visible. This reduction in visibility of the mismatch in resolution is made possible by the human visual system's different sensitivities of achromatic (luminance) and chromatic image components to position and motion. The chromatic acuity of the human visual system is significantly lower than its luminance acuity such that the perception of sharpness, fine detail and readability of text in displayed images is dominated by the achromatic image component.

In a preferred embodiment of the projection display of the present invention, the achromatic image component is displayed on the reflective display because this display maintains its contrast under a wide range of ambient light levels, and the perceived contrast is even improved at very high ambient light levels, such as sunlight. In order to render the luminance and chrominance information correctly using the projection display, the input image is separated into achromatic (black-and-white) and chromatic (color-only) components. Examples of color image encoding systems that perform such a separation into one luminance component and two chrominance components include, but are not limited to, YCbCr, YIQ, YCC, CIELab, and oRGB. The following methods may be used to display these achromatic and chromatic components using a projection display of the present invention.

The achromatic component may be displayed on the reflective image; the chromatic components being projected by a color projector onto this image. The eye of the observer will recombine (fuse) the displayed achromatic and chromatic image components into a full color image. Since the chromatic acuity of the human eye is significantly lower than its achromatic acuity, the perception of sharpness, fine detail and readability of text will be dominated by the achromatic component. If the chromatic components projected onto the reflective image have lower resolution and sharpness than the achromatic component displayed and/or chromatic and achromatic components are out of registration, this will not disturb the perception of sharpness, fine detail and readability of the combined image. In addition, the lower human visual sensitivity to motion of the chrominance components ensures that small variations over time of the relative positions of chromatic and achromatic image components, caused for example by vibration if the projector-to-reflective image alignment is not completely rigid, will not significantly disturb the perception of detail in the combined image.

In addition to chromatic image information, the projector engine may be supplied with achromatic (luminance) image information that has been spatially filtered to improve overall image quality without re-introducing the registration requirement. For example, the achromatic (luminance) channel may be low-pass filtered (blurred) so that the effects of misalignment and motion (vibration) between projected image and reflective image remain invisible, but the contrast of the combined image is increased as compared with an image where only the chrominance components are projected onto the reflective image.

These methods may be applied if the reflective image is a color image which carries both luminance and chrominance information, while the projected image carries only chrominance information, or chrominance and luminance information modified as described above.

Figure 3:
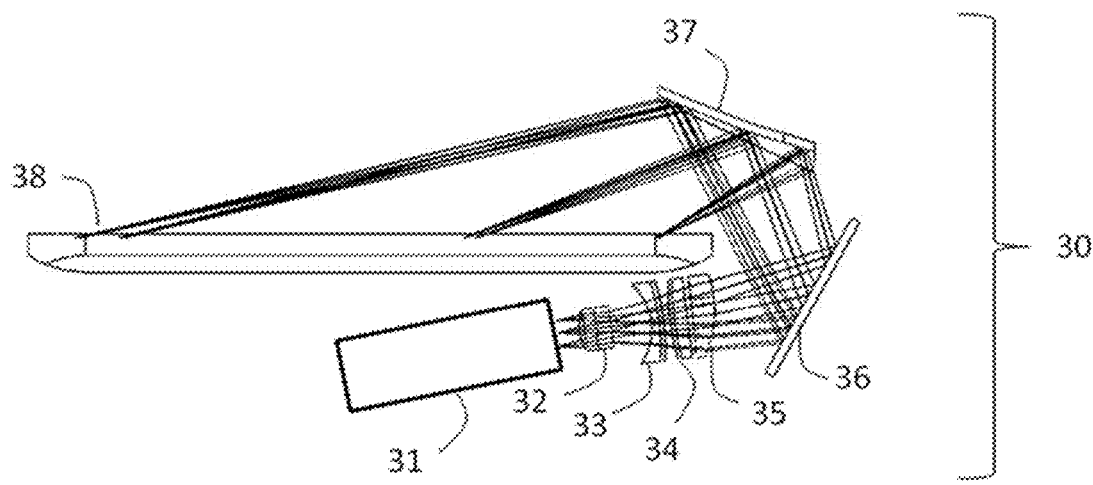
FIG. 3 is a side elevation of a projection engine used in a projection display of the present invention.

FIG. 3 shows an optical design for a projection display (generally designated 30) of the present invention. The projection display 30 comprises a projector module 31 that itself comprises a light source and a spatial light modulator, as described above, as well as associated optical elements such as beam splitters needed to produce modulated images in the three primary colors (red, green and blue). This image is projected on to the viewing surface 38 of a reflective display using the following optical elements:

(a) A projection lens or lens combination 32. The lens plane of projection lens 32 meets the planes of the light modulator (in the projector module 31) and of the reflective display 38 (corrected for the folding of the optical path by mirrors 36 and 37) at a common line (i.e., the modulator, projection lens 32 and reflective display 38 are arranged to meet the Scheimpflug condition);

(b) An aspheric achromat combination 33 designed to provide additional focusing of the projected image and to minimize chromatic aberration (this combination may alternatively be combined with projection lens 32);

(c) A toroidal lens 34, which minimizes astigmatism caused by cone mirror 37 (described below). The lens 34 may be eliminated if the mirror 37 has more complex curvature than a simple conic;

(d) A non-rotationally symmetric element 34, which provides variable focusing power with field location;

(e) A folding mirror 36, which can be a plane mirror (preferably) or curved (for instance, conic); and (f) A cone mirror 37, which steers the beam to appropriate locations on the viewing surface 38 of the display.

The optical elements in FIG. 3 are shown in positions to project an image from projector 31 on to viewing surface 38. When not in use, they may be folded down to conserve space or the entire assembly comprising elements 31-37 may be detachable from the reflective display. Alternatively, folding mirror 36 may be arranged to be removable from the optical path, or replaced by another optical element, such that the projector 31 can project an image on to a distant surface instead of on to the viewing surface 38.

The optical elements shown in FIG. 3 may be replaced by diffractive or holographic elements, or by elements using nano-optical phase discontinuity technology.

The location of the projection engine may be at the top, bottom or side of the viewing surface 38 as viewed in portrait mode by a reader. If the projection engine is located at the bottom of the viewing surface 38, other elements of the display, such as a keyboard, may be located above mirror 37 such that the mirror is not visible to the reader. Although the viewing surface 38 is shown as planar in FIG. 3, this is not essential since flexible reflective displays are well known in the art, and curvature of the display surface may be used to simplify or improve the optical design described above. Additional elements, such as light baffles, may be incorporated to reduce stray light reflected specularly from any of the surfaces of the display.

The projection display of the present invention may also include elements required to drive the projector means and the reflective display. It is not necessary that the two displays always be driven synchronously. Thus, for example, it may be desired to switch the reflective display to its white state (or possibly a gray state), completely or in part of its area, and to project an image onto this white region using the embedded projector. This is desirable, for example, if video rate content is to be viewed. In the current state of the art, the rate of switching of certain reflective display technologies is not as high as that of projection engines.

When video addressing it is not necessary that the frame rates of the reflective image and the projected image match. For instance, the projection engine may run at 60 frames per second but the reflective display may be run at 15 frames per second with a subset of the frames to enhance the contrast of the video.

Figure 4:
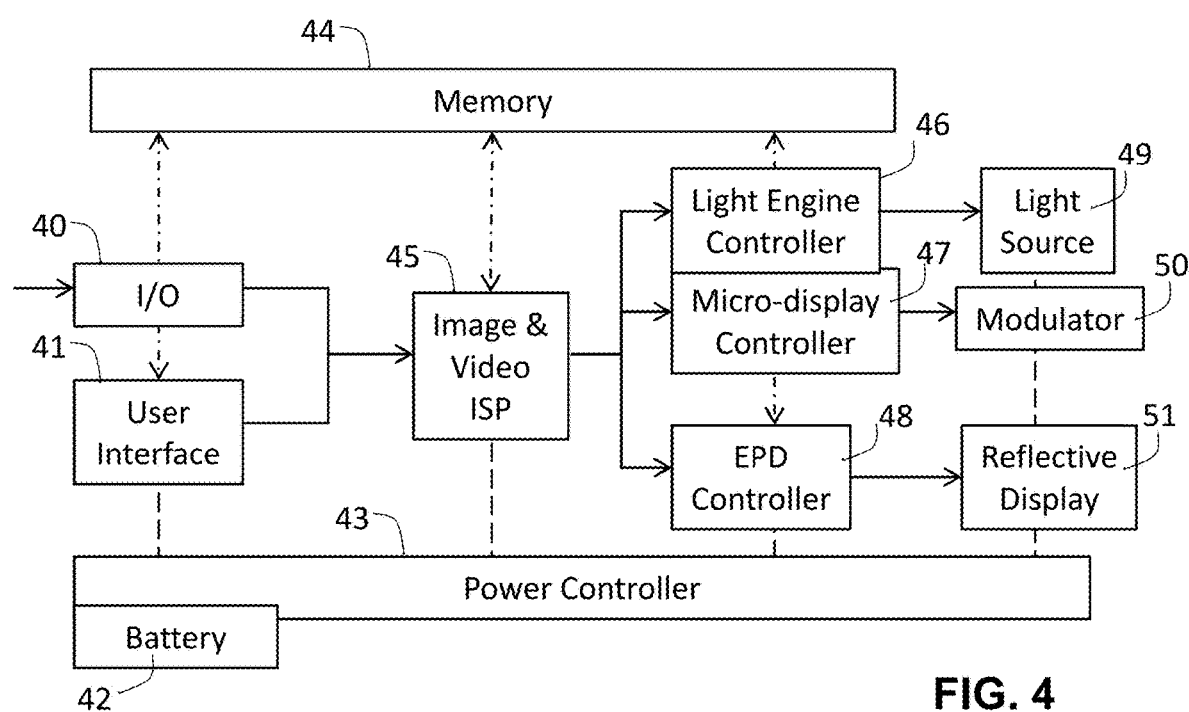
FIG. 4 is a block diagram showing a method of controlling a projection display of the present invention.

FIG. 4 is a block diagram of one possible controller architecture of a projection display of the present invention. The information to be displayed is loaded on to the controller by an input/output unit 4 and stored temporarily in memory 44 which also holds the necessary soft- and firmware. A user interface 41 allows the viewer to control all necessary functions such as loading, saving, selecting, and deleting of information, and to initiate and progress through the viewing of the information. An Image and Video Signal Processing unit 45 conditions the stored information for display, and executes image and video processing algorithms including, but not limited to, luminance and color correction, separation into components for reflective and projection display, image rendering to the display and projector resolution, dithering, geometric pre-distortion, and uniformity correction. The processed image signals are then transmitted to the necessary hardware controllers. An electrophoretic display controller 48 controls the pixels of the reflective display 51; a micro-display controller 47 controls those of the projector's image modulator 50. A Light Engine Controller 46 operates light sources 49 so that they can be adapted to the projected color image or video, and to ambient illumination levels, and switched off when not needed to conserve power from battery 42 which is supplied via a power controller 43.

The information display of the present invention will now be described in more detail. This display may function as an outdoor information display suitable for all lighting conditions, across a wide temperature range, configurable to operate with no requirement for a mains power source. The information display may consist of an electrophoretic display for daylight conditions, complemented by LED or similar light emitters for use in low light or other conditions. The light emitters may also be required to assist in dim daylight conditions, or may be used at all times to provide desired colors. The light emitters may be integrated into a front bezel or front illumination cavity to best suit the environment.

The information display of the present invention desirably requires very low power for operation, and the display may incorporate solar charging elements for self-sustaining operation without an external power supply. Since some types of electro-optic material do not function well in low temperatures, it may be necessary to incorporate a layer of front transparent or rear thermal material into the electro-optic portion of the display. Alternatively the light emitters may be able to generate sufficient heat to keep the electro-optic material within its operating range. Other forms of heating of the electro-optic material may be activated as needed to ensure proper switching.

The information display of the present invention is ideal to replace existing street signage, such as traffic lights and crosswalk signs, because of the benefits of being lighter weight, lower power, more visible in solar glare, better vandalism resistance, ability to be deployed easily in emergency environments, at a similar bill of material cost to the prior art signage.

A simple traffic light system could be formed by three separate electro-optic segmented cells each behind a complementary color filter. Such a system may include multiple light emitters for each cell, these light emitters being directed towards the electro-optic displays in a pattern to maximize the color visibility in low light conditions.

A simple cross walk sign could be of similar design to the traffic light, except instead of a single segmented electro-optic cell, the segmented cell could include multi-segmented icons or information.

These information displays can be made compatible with processor and detection systems to synchronize the appropriate display information with the situational need. Control system options can be provided to manage information wirelessly using low power and can incorporate solar charging elements for self-sustaining operation without a mains power supply.

The information display of the present invention offers the following benefits in comparison with prior art information displays:
  reduction of system weight;
  increased efficiency of power usage;
  improved visibility in solar glare;
  increased resistance to vandalism;
  simpler deployment in emergency situations;
  multiple improvements at a competitive bill of materials cost; and
  ability to scale in size with minimal design trade-offs.

Figure 5:
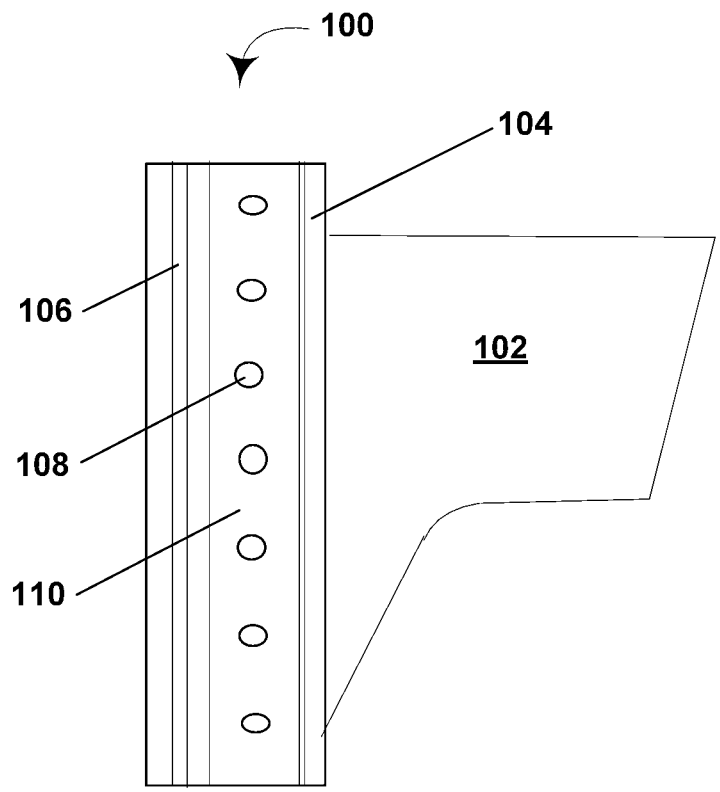
FIG. 5 is a side elevation of part of an information display of the present invention in the form of a traffic light, with part of its housing broken away to show the light sources.
Figure 6:
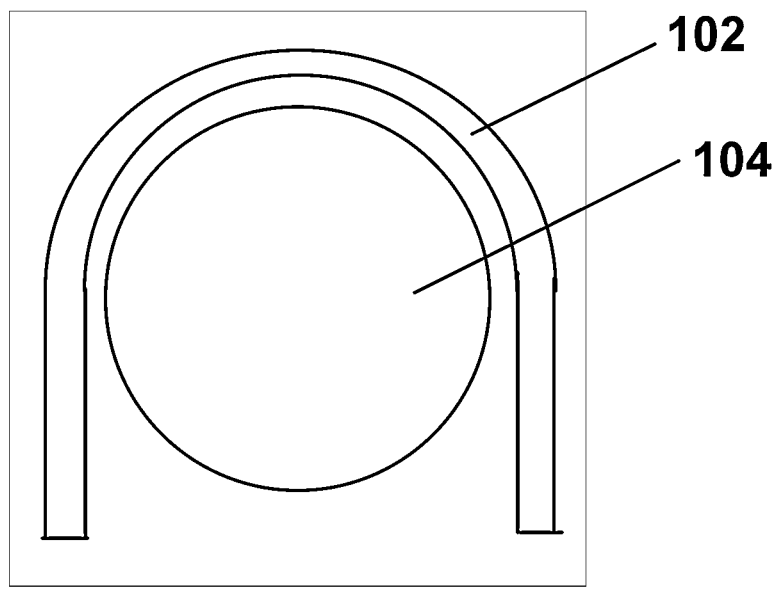
FIG. 6 is a front elevation of the same part of the information display as shown in FIG. 5.
Figure 7:
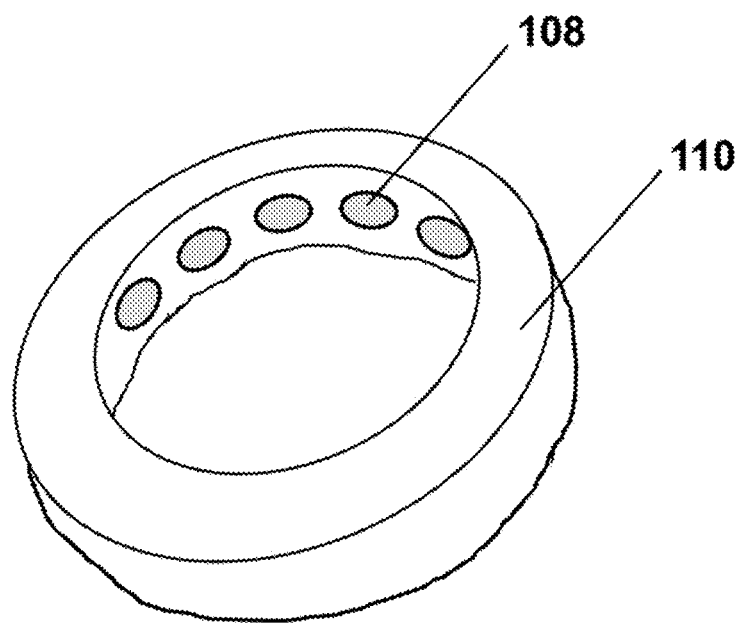
FIG. 7 is a three quarter view, from in front and to one side, of the sight source assembly of the information display shown in FIGS. 5 and 6.

FIG. 5 of the accompanying drawing is a side elevation of one cell (generally designated 100) of a three cell information display of the present invention in the form of a traffic light; part of the drawing is shown broken away to show internal details of the cell. The cell comprises a substantially hemicylindrical visor 102 (best seen in FIG. 6) which has a form similar to that in prior art traffic lights and a lens 104. A circular monochrome electrophoretic display 106 is disposed at the rear surface of the cell 100 and is provided with a single electrode (not shown) on each of its major surfaces to enable the display to function as a single pixel display. A plurality of light emitting diodes (LED's) 108 are disposed at uniform intervals around the internal surface of a collar 110 which surrounds the display 106 so that the light from the LED's 108 is directed on to the surface of the display 106. The collar 110 and the LED's 108 are shown on a larger scale in FIG. 7. The LED's 108 are of a single color, red, amber or green depending upon the particular cell of the traffic light.

In normal operation, the LED's are driven continuously, and the phases of the traffic light are controlled by switching the displays 106 between their light and dark states.

The electrophoretic displays of the present invention will now be described in more detail. As already mentioned, the third aspect of the present invention provides An electrophoretic display comprising: at least one front electrode through which an observer can view the display; a layer of an electrophoretic medium comprising a fluid and two types of electrically charged particles disposed in the fluid, one of the two types of particles being dark in color and the other being reflective and of a color different from that of the dark particles; at least one rear electrode disposed on the opposed side of the layer of electrophoretic medium from the front electrode(s), the rear electrode(s) having a plurality of apertures extending therethrough; and a light source disposed on the opposed side of the rear electrodes from the layer of electrophoretic medium and arranged to direct light through the layer of electrophoretic medium. This display has a first optical state in which the dark particles lie adjacent the front electrode(s), so that the observer sees a dark color, a second optical state in which the reflective particles lie adjacent the front electrode(s), so that the observer sees the color of the reflective particles, and a third optical state is which the dark particles lie adjacent the rear electrode(s), the reflective particles the light source generates light, and the color of the reflective particles is visible to an observer.

This aspect of the present invention will be described below primarily in its application as a brake light on a vehicle. However, the electrophoretic display of the present invention is not limited to this application, and may be used as any form of vehicle or traffic signage, or in other applications, such as warning lights on control panels. Basically, this electrophoretic display is designed to have the normal dark and colored states of a conventional dual particle electrophoretic display, together with an additional emissive state (especially useful in low light conditions) in which light from the light source passes through the electrophoretic medium and emerges displaying the color of the colored particles.

Figure 9:
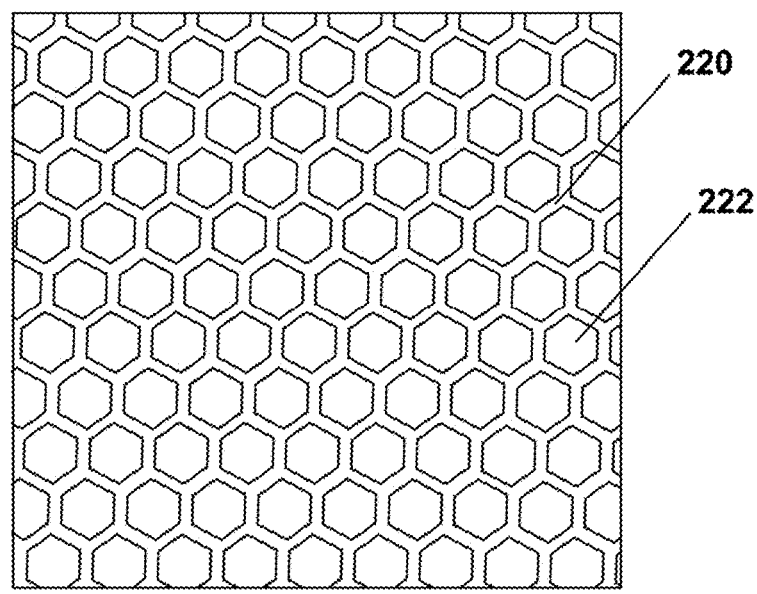
FIG. 9 is a front elevation of the rear electrode of the electrophoretic display shown in FIG. 8.
Figure 8:
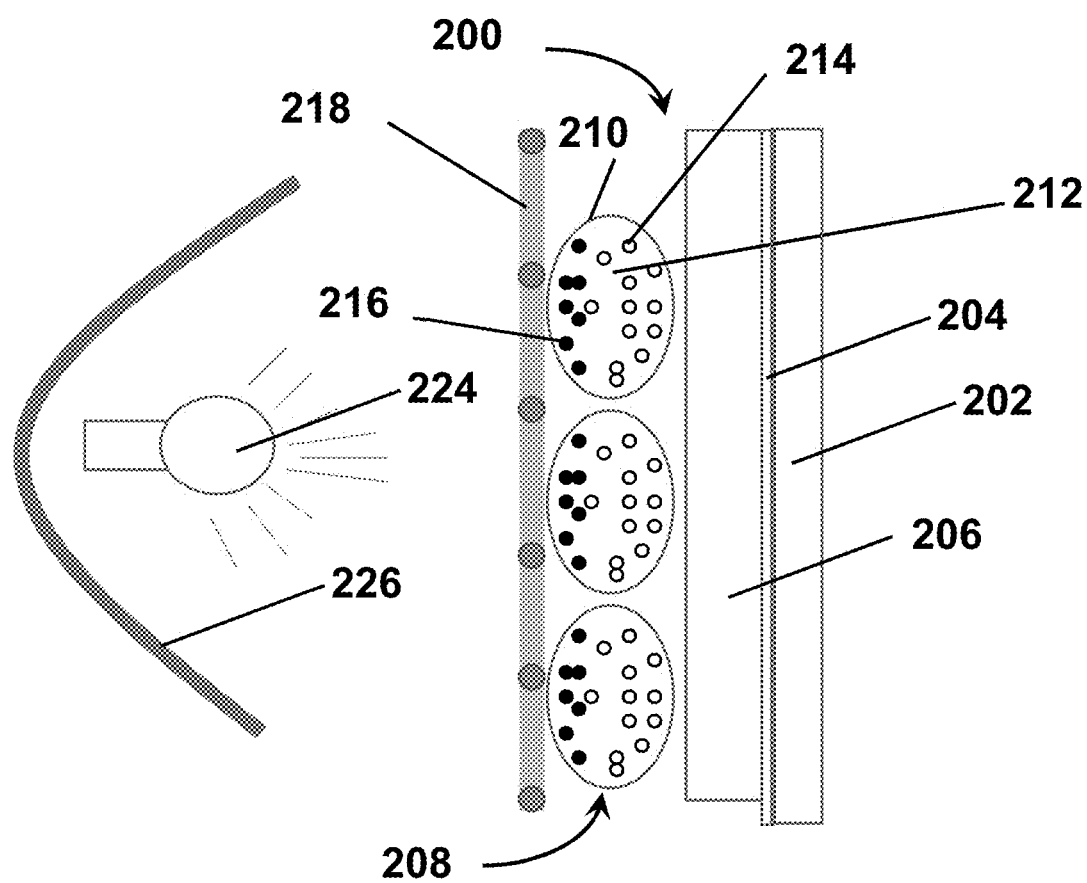
FIG. 8 is a schematic cross-section through an electrophoretic display of the present invention having the form of brake light for an automobile.

One electrophoretic display of the present invention (generally designed 200) is illustrated in FIGS. 8 and 9 of the accompanying drawings. The display 200 has the form of a brake light for a vehicle and comprises a moisture barrier film 202 (which serves to protect the remaining components of the display 200 from ambient moisture, including spray when the vehicle is driven in wet conditions), a substantially transparent front electrode 204, an adhesive layer 206 and a layer of electrophoretic medium (generally designated 208). The layer of electrophoretic medium 208 is an encapsulated electrophoretic medium comprising numerous capsules having capsule walls 210 enclosing a dielectric fluid 212 in which are dispersed red particles 214 and black particles 216, the red and black particles bearing charges of opposite polarity. Behind the layer 208 (i.e., to the left as illustrated in FIG. 8 is a rear grid electrode 218; as best seen in FIG. 9, this grid electrode 218 comprises wires 220 arranged in a hexagonal pattern leaving most of the area of the electrode 218 occupied by hexagonal apertures 222. Finally, on the opposed side of the electrode 218 from the medium 208 is disposed a light source in the form of an incandescent bulb 224 equipped with a parabolic reflector 226. Although not shown in FIG. 8, the electrophoretic display comprising components 202-218 may be secured to the reflector 226 with a layer of optically clear adhesive; the bulb 224 and reflector 226 may form part of a prior art vehicle brake light.

The display 200 is provided with a voltage source (not shown) for establishing a potential difference between the electrodes 204 and 218. When it is not desired to display the brake light, the potential difference between the electrodes 204 and 218 is set to attract the black particles 216 adjacent the electrode 204 and the red particles 214 adjacent the electrode 218, so that the display assumes a first optical state in which the surface of the brake light appears dark. Note that in this state it does not matter whether the bulb 224 is or is not lit, since no light will emerge from the display 200; however, to conserve power and increase bulb life, the bulb 224 will normally be turned off.

When it is necessary to turn the brake light on, the potential difference between the electrodes 204 and 218 is reversed, so that the red particles 214 lie adjacent the electrode 204 and the black particles 216 adjacent the electrode 218. Thus, the display assumes a second optical state in which the red particles 214 reflect light incident on the display and the brake light appears red and "lit".

The explanation of the operation of the display 200 has so far assumed high ambient lighting conditions. In low light conditions, to turn the brake light on, the potential difference between the electrodes 204 and 218 is arranged so that the red particles 214 lie adjacent the electrode 204 and the black particles 216 adjacent the electrode 218, and the bulb 224 is illuminated so that the display assumes a third optical state in which light from the bulb 224 formed into a narrow beam by the parabolic reflector 226 passes through the red particles 214 adjacent the electrode 204, thus causing red light to be emitted from the display and the brake light to appear lit. Thus, the display 200 can achieve significantly improved contrast in both low and high light conditions.

An appropriate drive scheme involving voltage or pulse width modulation may be used in the display 200 to produce a state of defined visibility. Such a driving scheme could be synchronized to a clock or to a light sensor or a temperature sensor to produce the desired visibility level at any time of the day.

Figure 10:
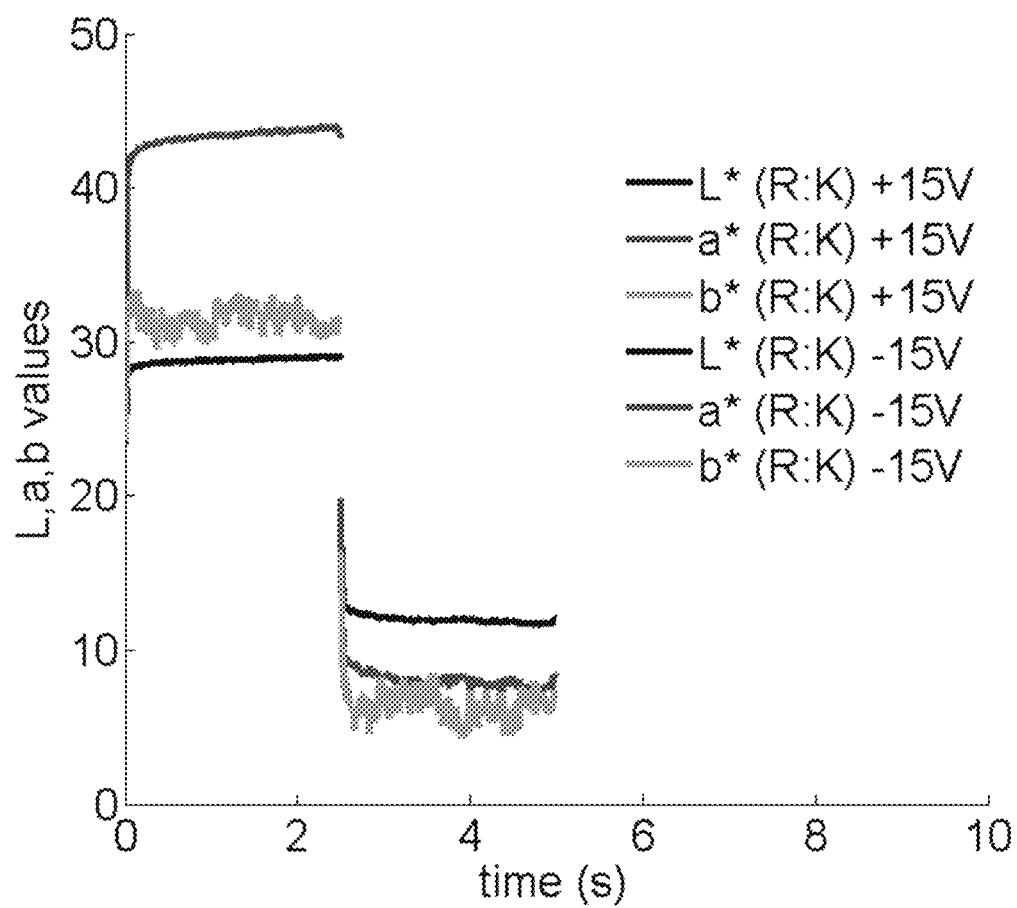
FIG. 10 is a graph of L*a*b* values against time achieved by the electrophoretic display shown in FIGS. 8 and 9 in certain experiments described below.

To provide an experimental test of an electrophoretic display of the present invention, a red and black pigment dispersion was prepared containing Solsperse 17k as a charging agent. The red pigment Paliotan Red L 3745, was treated with the silane Z6030 and coated with poly(lauryl methacrylate) substantially as described in Example 28 of U.S. Pat. No. 8,822,782. An electrophoretic medium comprising of 50 weight percent pigment with 10:1 Red/Black ratio and 25 mg/gm of Solsperse 17k in Isopar E was made and tested in a liquid test cell. As shown in FIG. 10, the medium achieved a red state of 45a* and a dark state of 10 L* (0.01% reflectance).

After replacing the backplane of the test cell with a transparent grid electrode, the black pigment was observed to shutter in response to an applied electric field. A movie of the transmission through the test cell was acquired on a camera and variable transmission through the device was clearly visible.

The electrophoretic medium of the present invention is not, of course, confined to the use of red particles. Provided one of the particles is highly absorbing, the other particle may be reflective (white), colored, retro-reflective or transparent. One or more dyes may also be included in the fluid to achieve desired color states in the display.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A display system, comprising:
a reflective display for rendering a first image viewable through a viewing surface; and
a projection system including a light source, one or more optical elements, and a light modulator for rendering a second image viewable in reflection on the viewing surface, the second image having approximately the same width and height as the first image and being superimposed on the first image to form a composite image, wherein the first image has w1 pixels in the width dimension and h1 pixels in the height dimension, where h1>w1, and the second image has w2 pixels in the width dimension and h2 pixels in the height dimension, where h2<w2.

2. The display system of claim 1, wherein the reflective display is an electrophoretic display, an electro-wetting display, an electrochromic display, a rotating bichromal display, or a reflective liquid crystal display.

3. The display system of claim 2, wherein the reflective display is an electrophoretic display including an electrophoretic medium comprising a plurality of electrically charged particles disposed in a fluid and capable of moving through the fluid under the influence of an electric field.

4. The display system of claim 3, wherein the electrically charged particles and the fluid are confined within a plurality of capsules or microcells.

5. The display system of claim 1, wherein pixels of the second image rendered by the projection system are mapped 1:1 onto pixels of the first image rendered by the reflective display.

6. The display system of claim 1, wherein the first image comprises achromatic image components and the second image comprises chromatic image components.

7. The display system of claim 1, wherein the light source comprises a color light-emitting diode (LED) or a solid state color laser source.

8. The display system of claim 1, wherein the projection system comprises a pico-projector.

9. The display system of claim 1, wherein the reflective display comprises an electronic document reader or an electronic book.

10. The display system of claim 1, wherein the light modulator is in a landscape orientation, and the second image viewable in reflection on the viewing surface is in a portrait orientation.

11. The display system of claim 1, wherein a long axis of the light modulator is projected onto a short axis of the viewing surface.

12. The display system of claim 1, wherein the frame rate of the reflective display differs from that of the projection system by at least 10 percent.

13. A display system, comprising:
a reflective display for rendering a first image viewable through a viewing surface; and
a projection system including a light source, one or more optical elements, and a light modulator for rendering a second image viewable in reflection on the viewing surface, the second image having approximately the same width and height as the first image and being superimposed on and in registration with the first image to form a composite image, wherein pixels of the second image are mapped 1:1 onto pixels of the first image, and wherein the frame rate of the reflective display differs from that of the projection system by at least 10 percent.

14. The display system of claim 13, wherein the projection system operates at about 60 frames per second and the reflective display operates at about 15 frames per second to enhance video contrast.

15. The display system of claim 13, wherein the reflective display is an electrophoretic display including an electrophoretic medium comprising a plurality of electrically charged particles disposed in a fluid and capable of moving through the fluid under the influence of an electric field.

* * * * *